US 9,554,083 B2

(12) United States Patent
Jeon et al.

(10) Patent No.: US 9,554,083 B2
(45) Date of Patent: Jan. 24, 2017

(54) METHODS FOR SELECTING RESOLUTION WITH MINIMUM DISTORTION VALUE AND DEVICES PERFORMING THE METHODS

(71) Applicants: Jun Shik Jeon, Yongin-si (KR); Sung Ho Roh, Seoul (KR); Tae-Hyun Kim, Seongnam-si (KR)

(72) Inventors: Jun Shik Jeon, Yongin-si (KR); Sung Ho Roh, Seoul (KR); Tae-Hyun Kim, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 172 days.

(21) Appl. No.: 14/338,758

(22) Filed: Jul. 23, 2014

(65) Prior Publication Data
US 2015/0042878 A1 Feb. 12, 2015

(30) Foreign Application Priority Data
Aug. 12, 2013 (KR) .................. 10-2013-0095644

(51) Int. Cl.
| H04N 7/12 | (2006.01) |
| H04N 11/02 | (2006.01) |
| H04N 11/04 | (2006.01) |
| H04N 7/01 | (2006.01) |
| H04N 19/59 | (2014.01) |

(52) U.S. Cl.
CPC ............ *H04N 7/0117* (2013.01); *H04N 19/59* (2014.11)

(58) Field of Classification Search
None
See application file for complete search history.

(56) References Cited

U.S. PATENT DOCUMENTS

| 7,379,496 B2 | 5/2008 | Holcomb et al. |
| 8,250,618 B2 | 8/2012 | Rosenzweig et al. |
| 8,270,473 B2 | 9/2012 | Chen et al. |
| 8,311,097 B2 | 11/2012 | Ma |

(Continued)

FOREIGN PATENT DOCUMENTS

| KR | 20030082818 A | 10/2003 |
| KR | 20060132890 A | 12/2006 |

(Continued)

OTHER PUBLICATIONS

Cahn von Seelen, Ulf M., Adaptive correlation tracking of targets with changing scale, Jun. 1996, 14 pages, Department of Computer and Information Science, University of Pennsylvania.

(Continued)

*Primary Examiner* — Frederick Bailey
*Assistant Examiner* — Talha M Nawaz
(74) *Attorney, Agent, or Firm* — Harness, Dickey & Pierce, P.L.C.

(57) ABSTRACT

A method of operating an image processing according to an example embodiment includes generating a plurality of encoded bitstreams having different resolutions using an original image output from a video source, generating a plurality of restored images corresponding to the plurality of encoded bitstreams, respectively, the plurality of restored images having a same resolution as a first resolution of the original image, and outputting one of the plurality of encoded bitstreams, based on the plurality of restored images and the original image.

16 Claims, 15 Drawing Sheets

(56) References Cited

U.S. PATENT DOCUMENTS

| | | | |
|---|---|---|---|
| 8,659,592 B2 * | 2/2014 | Wang | G06T 7/0081 345/419 |
| 2002/0064314 A1 | 5/2002 | Comaniciu et al. | |
| 2002/0136298 A1 | 9/2002 | Anantharamu et al. | |
| 2004/0213345 A1 | 10/2004 | Holcomb et al. | |
| 2006/0018378 A1 | 1/2006 | Piccinelli et al. | |
| 2007/0147494 A1 * | 6/2007 | Shimauchi | H04N 19/29 375/240.1 |
| 2008/0152002 A1 * | 6/2008 | Haque | H04N 19/61 375/240.12 |
| 2009/0290635 A1 | 11/2009 | Kim et al. | |
| 2010/0316126 A1 * | 12/2010 | Chen | H04N 19/124 375/240.16 |
| 2013/0021505 A1 * | 1/2013 | Plowman | H04N 5/357 348/241 |
| 2014/0015922 A1 * | 1/2014 | Zhang | H04N 19/56 348/43 |
| 2015/0042878 A1 * | 2/2015 | Jeon | H04N 7/0117 348/441 |

FOREIGN PATENT DOCUMENTS

| | | |
|---|---|---|
| KR | 100734314 B1 | 6/2007 |
| KR | 20110045912 A | 5/2011 |
| KR | 20120036309 A | 4/2012 |
| KR | 20120066611 A | 6/2012 |

OTHER PUBLICATIONS

Tiecheng Liu, Content-adaptive wireless streaming of instructional videos, 2006, 157-171 (15 pages), Springer Science + Business Media, Inc.

\* cited by examiner

METHODS FOR SELECTING RESOLUTION WITH MINIMUM DISTORTION VALUE AND DEVICES PERFORMING THE METHODS

CROSS-REFERENCE TO RELATED APPLICATIONS

This application claims priority under 35 U.S.C. §119(a) from Korean Patent Application No. 10-2013-0095644 filed on Aug. 12, 2013, the disclosure of which is hereby incorporated by reference in its entirety.

BACKGROUND

Example embodiments of inventive concepts relate to an image processing method which may selectively output an encoded bitstream having a resolution related to a minimum distortion value and devices performing the method.

Image sensors such as a charge coupled device (CCD) image sensor or a CMOS image sensor (CIS) capture an image and output the image as the image data.

As technology of manufacturing image sensors has been developed, a capacity or a volume of the image data has increased.

In order to inhibit the capacity of the image data from being increased, various image compression methods of compressing the image data has been studied. When the image data are compressed, the capacity (or size) of the image data is decreased. However, compression of the image data may affect the image quality.

SUMMARY

An example embodiment is directed to a method of operating an image processing, including generating a plurality of encoded bitstreams having different resolutions using an original image output from a video source, generating a plurality of restored images corresponding to the plurality of encoded bitstreams, respectively, the plurality of restored images having a same resolution as a first resolution of the original image, and outputting one of the plurality of encoded bitstreams, based on the plurality of restored images and the original image.

The generating the plurality of encoded bitstreams includes generating a first encoded bitstream having the first resolution, generating at least one down-scaled image, the at least one down-scaled image having a resolution different from the first resolution, and generating at least one second encoded bitstream from the at least one down-scaled image. The plurality of encoded bitstreams include the first encoded bitstream and the at least one second encoded bitstream.

The generating the plurality of restored images includes generating a first restored image having the first resolution using the first encoded bitstream, generating at least one decoded image using the at least one second encoded bitstream and generating at least one up-scaled image having the first resolution using the at least one decoded image. The plurality of restored images include the first restored image and the at least one up-scaled image.

The outputting includes, comparing a first distortion value between the first restored image and the original image and a second distortion value between the at least one up-scaled image and the original image.

The outputting includes computing distortion values between each of the plurality of restored images and the original image, and outputting the one of the plurality of encoded bitstreams, the outputted encoded bitstream associated with a minimum distortion value among the distortion values.

Each of the distortion values is based on a GOP basis. Each of the distortion values is one of a sum of absolute differences (SAD), a sum of squared differences (SSD), a mean absolute difference (MAD) and a normalized cross-correlation (NCC).

Each of the plurality of encoded bitstreams is changed based on the plurality of target bit-rates, respectively. The image processing device is configured to provide video hosting services.

The method further includes analyzing the output encoded bitstream, and decoding the output encoded bitstream according to a result of the analyzing and processing the decoded bitstream, the processing including one of (i) outputting the decoded bitstream to a display, and (ii) up-scaling the decoded bitstream and outputting the up-scaled bitstream to the display according to a result of the analyzing. The analyzing extracts and stores a resolution of the outputted encoded bit stream by parsing the outputted encoded bitstream.

In the outputting to the display, the decoded bitstream is up-scaled if a resolution associated with the decoded bitstream is less than the stored resolution.

An example embodiment of inventive concepts is directed to an image processing device, including a plurality of encoder circuits configured to generate a plurality of encoded bitstreams, respectively, the plurality of encoded bitstreams having different resolutions based on an original image, the plurality of encoder circuits further configured to generate a plurality of restored images having the same resolution as a first resolution of the original image using the plurality of encoded bitstreams, respectively, and an output circuit configured to output one of the plurality of encoded bitstreams based on the plurality of restored images and the original image.

The output circuit is configured to compare a first distortion value between the first restored image and the original image and a second distortion value between the up-scaled image and the original image.

The output circuit includes a comparator configured to compute difference values between the plurality of restored images and the original image, and generate at least one selection signal related to a minimum difference value among the difference values, and a selector configured to output the outputted encoded bitstream in response to the at least one selection signal.

An example embodiment of inventive concepts is directed to a System on Chip, including an image processing device configured to processes an original image output from a memory where the original image is stored. The image processing device includes a plurality of encoder circuits configured to generate a plurality of encoded bitstreams, respectively, the plurality of encoded bitstreams having different resolutions based on the original image, the plurality of encoder circuits further configured to generate a plurality of restored images having the same resolution as a first resolution of the original image using the plurality of encoded bitstreams, respectively, and an output circuit configured to output one of the plurality of encoded bitstreams based on the plurality of restored images and the original image.

Another example embodiment discloses an encoding device including a first encoder circuit configured to receive an original image and encode the original image, the original image having a first resolution, the first encoder circuit further configured to generate a first restored image based on the encoded original image, the first restored image being a first restored image of the original image, at least one second encoding circuit including, a down scaler configured to receive the original image, down-scale the original image and generate a down-scaled image, the down-scaled image having a second resolution different than the first resolution and an internal encoder configured to receive the down-scaled image and encode the down-scaled image, the at least one second encoding circuit further configured to generate a second restored image based on the encoded down-scaled image, the second restored image being a second restored image of the original image and an output circuit configured to select one of the encoded down-scaled image and the encoded original image to output based on the first and second restored images

BRIEF DESCRIPTION OF THE DRAWINGS

These and/or other aspects and advantages of inventive concepts will become apparent and more readily appreciated from the following description of the embodiments, taken in conjunction with the accompanying drawings of which.

DETAILED DESCRIPTION OF EXAMPLE EMBODIMENTS

Figure 1:
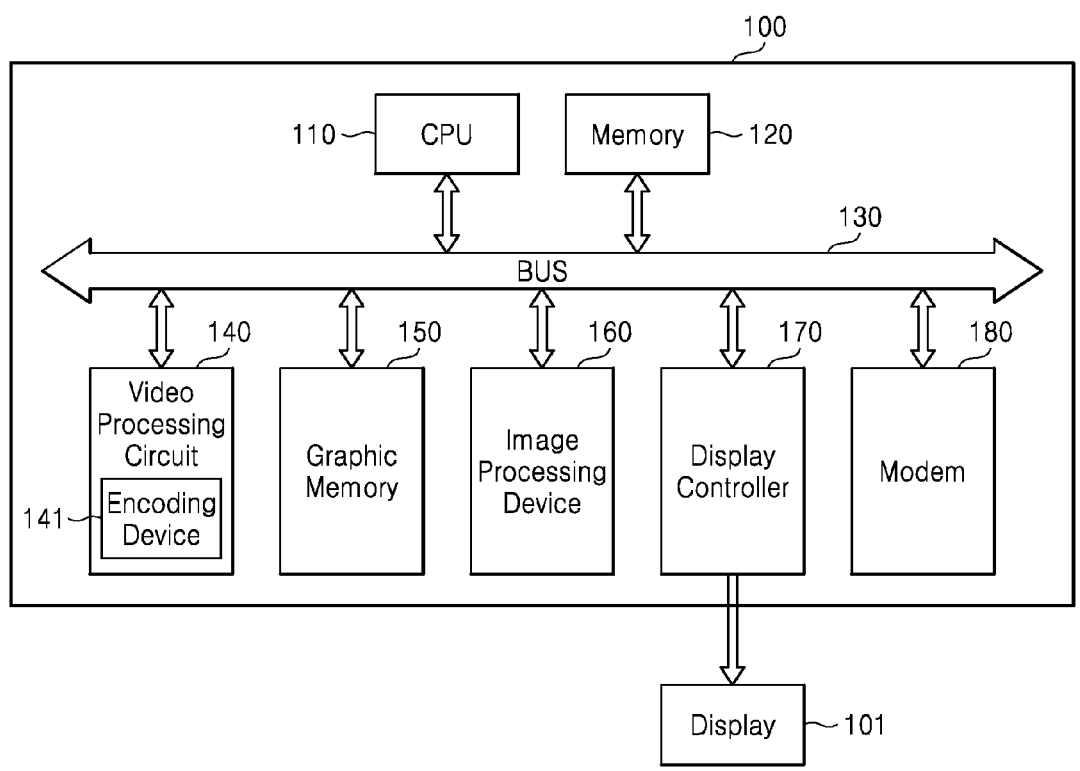
FIG. 1 is a block diagram of an application processor according to an example embodiment of inventive concepts.

Inventive concepts now will be described more fully hereinafter with reference to the accompanying drawings, in which example embodiments are shown. Inventive concepts may, however, be embodied in many different forms and should not be construed as limited to example embodiments set forth herein. Rather, example embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an application processor according to an example embodiment of inventive concepts. Referring to FIG. 1, an application processor 100 may be referred to as an integrated circuit (IC), a processor, a System on Chip (SoC), a multimedia processor, or an integrated multimedia processor.

The application processor 100 includes a central processing unit (CPU) 110, a memory 120, a video processing circuit 140, a graphic memory 150, an image processing device 160, a display controller 170, and a modem 180.

The application processor 100 may be connected to a display 101 which may display an image. Each component 110, 120, 140, 150, 160, 170, and 180 may communicate (or transmit or receive data) with each other through a bus 130. According to an example embodiment, an architecture of the bus 130 may be variously modified. The CPU 110 may read and perform program commands so as to control each component 120, 140, 150, 160, 170, and 180.

The memory 120 may store a bitstream output from an encoding device 141 of the video processing circuit 140 for a transmission to outside, or transmit an encoded bitstream stored in the memory 120 to the video processing circuit 140 for decoding.

The memory 120 may be embodied in a volatile memory or a non-volatile memory. The volatile memory may be a dynamic random access memory (DRAM), a static random access memory (SRAM), a thyristor RAM (T-RAM), a zero-capacitor RAM (Z-RAM), or a Twin Transistor RAM (TTRAM). The non-volatile memory may be an Electronically Erasable Programmable Read-Only Memory (EEPROM), a flash memory, a Magnetic RAM (MRAM), a Phase change RAM (PRAM), or a resistive memory.

The display controller 170 controls the display 101 so as to display video data encoded and/or decoded by a corresponding component 140 or 160 on the display 101.

The modem 180 modulates information, e.g., digital information, to transmit the information to outside and transmits the modulated information to the outside, or demodulates information received from the outside so that the received information may be processed by the application processor 100.

The modem 180 is widely used in a device for information communication. The reason to modulate a signal, e.g., a digital signal, is because of a poor transmission of the signal occurring when immediately transmitting the signal through a transmission line. When a digital signal is sequentially transmitted with the same value, there may be a problem in a delivery of the digital signal due to the characteristic of a signal transmission, and therefore the modem 180 may modulate the digital signal according to the characteristic of the transmission line.

In order to transmit a bitstream and other information output from the video processing circuit 140, the modem 180 performs a modulation on the bitstream and the information.

The graphic memory 150 may store graphic data processed or to be processed, and when performing an operation(s) related to a processing of the graphic data, the graphic memory 150 may greatly reduce load of the CPU 110. The graphic memory 150 may support complex and various commands such as pixel shader (or pixel shading), vertex shader (or vertex shading), super sampling, or color space conversion, and include a function of accelerating reproduction of a digital image.

The image processing device 160 performs an operation related to an image input through an external camera (not shown), and a processing of the image.

The video processing circuit 140 encodes and/or decodes a bitstream so as to display video data on the display 101, and outputs video data generated as the result of the encoding and/or decoding to the display 101. The video processing circuit 140 may receive an image input from the external camera and/or an external memory.

The video processing circuit 140 includes the encoding device 141. The encoding device 141 may change a target bit rate according to a network condition for transmitting an original image. The encoding device 141 may be hardware, firmware, hardware executing software or any combination thereof. When the encoding device 141 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the encoding device 141. CPUs, DSPs, ASICs and FPGAs may generally be referred to as processors and/or microprocessors.

In the event where the encoding device 141 is a processor executing software, the video processing circuit 140 and/or the CPU 110 are configured as special purpose machines to execute the software to perform the functions of the encoding device 141. In such an embodiment, the video processing circuit 140 may include one or more Central Processing Units (CPUs), digital signal processors (DSPs), application-specific-integrated-circuits (ASICs), field programmable gate arrays (FPGAs) computers.

The encoding device 141 may generate each of a plurality of encoded bitstreams each having a different resolution using an original image, and generate a plurality of restored images each having the same resolution as a resolution of the original image using each of the plurality of generated encoded bitstreams.

The encoding device 141 may compare each of the plurality of restored images which are generated with an original image, and transmit one bitstream selected among the plurality of encoded bitstreams according to results of the comparison to the display 101 through corresponding components 130 and 170. An architecture and an operation of the encoding device 141 will be described in detail referring to FIGS. 3 to 8.

Figure 2:
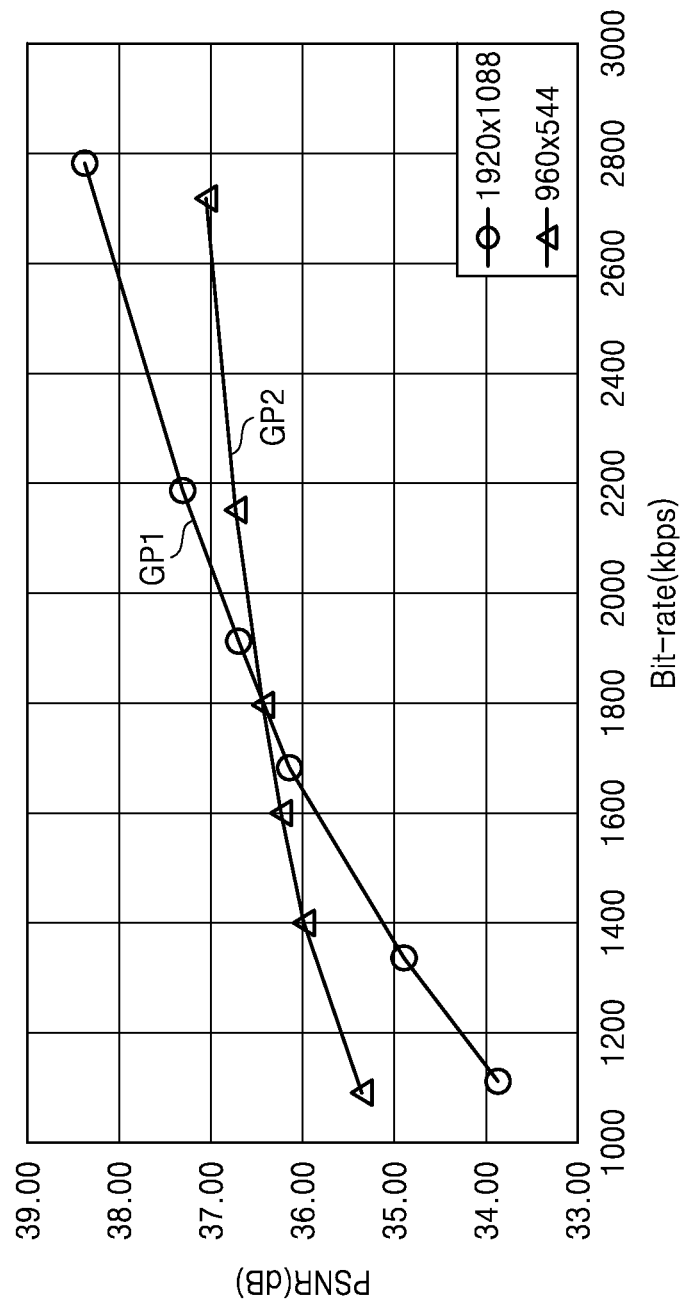
FIG. 2 is a graph of image quality by resolution according to a bit-rate for describing a technology in the related art.

FIG. 2 is a graph of image quality by resolution according to a bit rate for describing the related art. For convenience of description, a resolution of an original image is assumed to be 1920*1088. Referring to FIG. 2, a graph GP1 is a rate distortion curve showing a peak signal-to-noise ratio (PSNR) change according to a bit rate when one image is encoded with the resolution of the original image, e.g., 1920*1088.

A graph GP2 is a rate distortion curve showing a peak signal-to-noise ratio (PSNR) change when one image is down-scaled and encoded with a resolution, e.g., 960*544, which is ¼ of the resolution of the original image.

As known in each graph GP1 and GP2, at a relatively high bit rate (e.g., a bit rate equal to or greater than 1800 kbps), an image quality at the time when an original image is encoded with an original resolution is better than an image quality at the time when the original image is down-scaled and encoded.

However, at a relatively low bit rate (e.g., a bit rate less than 1800 kbps), the image quality at the time when an original image is down-scaled and encoded is better than the image at the time when an original image is encoded with an original resolution. Accordingly, changing a resolution of the original image according to a bit rate is one of effective methods to provide a user with an image with a higher image quality.

As the related art for supporting this, there is suggested a method of changing a resolution on a macroblock basis, wherein the macroblock means a small processing unit of an image compression on a block basis, in one frame or picture of an image.

Figure 3:
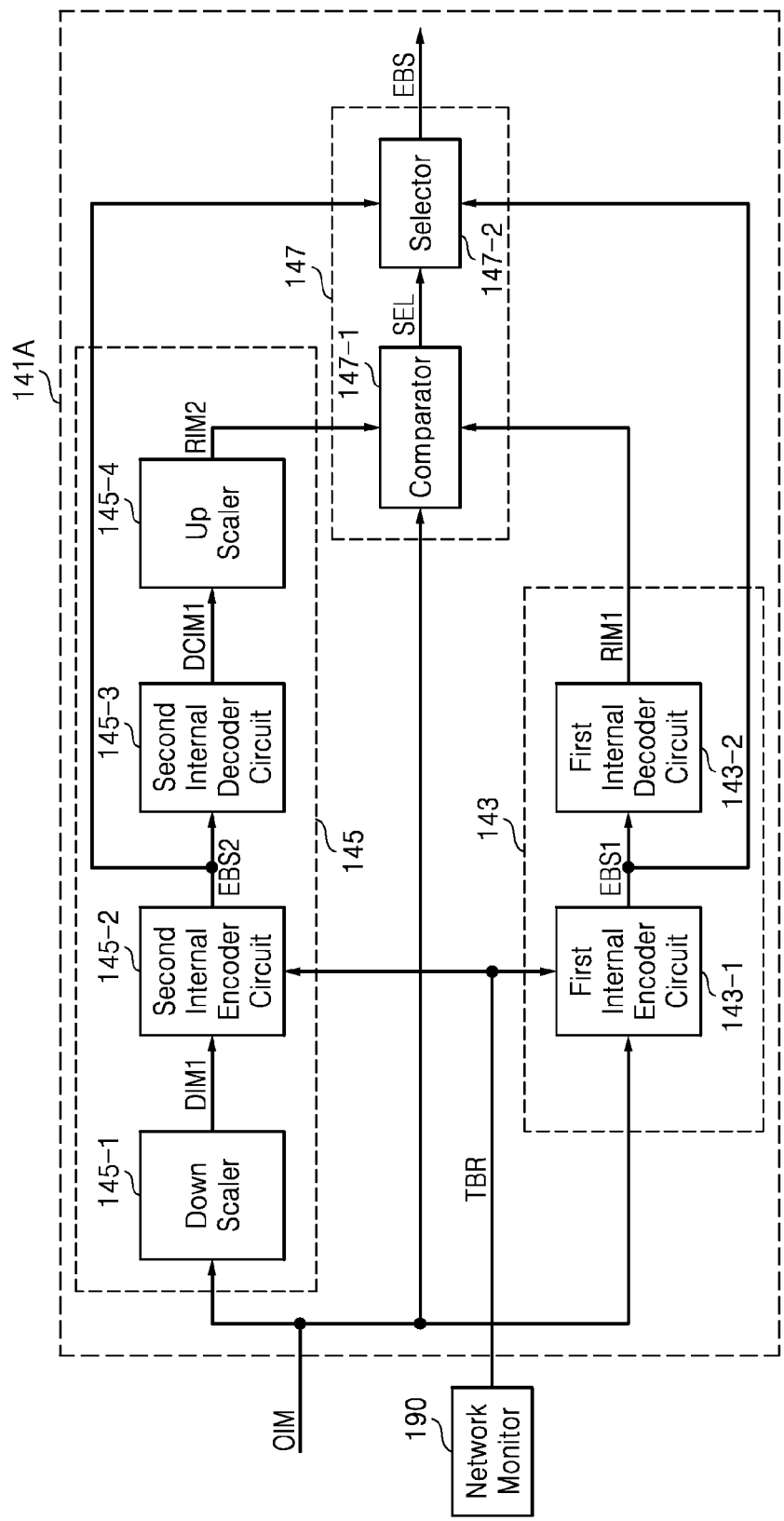
FIG. 3 is a block diagram according to an example embodiment of an encoding device illustrated in FIG. 1.

FIG. 3 is a block diagram according to an example embodiment of inventive concepts. Referring to FIG. 3, an encoding device 141A according to an example embodiment of the encoding device 141 illustrated in FIG. 1 may be included in the video processing circuit 140 illustrated in FIG. 1.

The encoding device 141A includes a first encoding circuit 143, a second encoding circuit 145, and an output circuit 147. The first encoding circuit 143 includes a first internal-encoder circuit 143-1 and a first internal-decoder circuit 143-2. The second encoding circuit 145 includes a down scaler 145-1, a second internal-encoder circuit 145-2, a second internal-decoder circuit 145-3, and an up-scaler 145-4.

The output circuit 147 includes a comparator 147-1 and a selector 147-2. The encoding device 141A may be connected to a network monitor 190.

The encoding device 141A may generate each of a plurality of encoded bitstreams EBS1 and EBS2 having different resolutions from each other based on an original image OIM, generate each of a plurality of restored images RIM1 and RIM2 having the same resolution as a first resolution of the original image OIM using each of the plurality of encoded bitstreams EBS1 and EBS2, compare each of the plurality of restored images RIM1 and RIM2 with the original image OIM, and output one of the plurality of encoded bitstreams EBS1 and EBS2 as an output bitstream EBS based on results of the comparison.

The first internal-encoder circuit 143-1 may generate a first encoded bitstream EBS1 having the same resolution as the first resolution of the original image OIM based on the original image OIM. The first encoded bitstream EBS1 may be changed based on a target bit rate TBR transmitted from the network monitor 190.

The first internal-decoder 143-2 may generate a first restored image RIM1 having the first resolution using the first encoded bitstream EBS1.

The down-scaler 145-1 may generate a down-scaled image DIM1 having a resolution different from the first resolution. For example, when the first resolution is 1920*1088, the down-scaler 145-1 may generate a down-scaled image DIM1 having ¼ of the resolution of the original image OIM, i.e., a second resolution 960*544.

The second internal-encoder 145-2 generates a second encoded bitstream EBS2 from the down-scaled image DIM1. The second encoded bitstream EBS2 may be changed based on a target bit rate TBR transmitted from the network monitor 190.

The second internal-decoder 145-3 may generate a decoded image DCIM1 using a second encoded bitstream EBS2. The up-scaler 145-4 may generate an up-scaled image RIM2 having the first resolution, i.e., a second restored image, using the decoded image DCIM1. The output circuit 147 may compare distortion values between each of the first restored image RIM1 and the up-scaled image RIM2 and the original image OIM.

The comparator 147-1 may compute (or calculate) difference values between each of the plurality of restored images RIM1 and RIM2 and the original image OIM, and generate at least one selection signal SEL related to the minimum difference value among the difference values.

The plurality of restored images RIM1 and RIM2 include the first restored image RIM1 and the up-scaled image RIM2. For example, a difference value between the first restored image RIM1 and the original image OIM is set to a first difference value, and a difference value between the up-scaled image RIM2 and the original image OIM is set to a second difference value.

The comparator 147-1 may compare the first difference value, e.g., DV1=|OIM−RIM1|, with the second difference value, e.g., DV2=|OIM−RIM2|, and generate a selection signal SEL which may select a resolution or an encoded bitstream related to the minimum difference value.

When the first difference value DV1 is smaller than the second difference value DV2, the comparator 147-1 generates a selection signal SEL which may selectively output the first encoded bitstream EBS1 having a resolution related to the first difference value DV1, i.e., the first resolution of the original image OIM.

However, when the second difference value DV2 is smaller than the first difference value DV1, the comparator 147-1 generates a selection signal SEL which may selectively output the second encoded bitstream EBS2 having a resolution related to the second difference value DV2, i.e., the second resolution lower than the first resolution of the original image OIM.

The selection signal SEL may be transmitted to the selector 147-2. Each of the difference values DV1 and DV2 may be accumulated on a group of picture (GOP) basis. According to some example embodiments, each of the difference values may mean each of distortion values, and each of the distortion values may be generated in a sum of absolute differences (SAD) method, a sum of squared differences (SSD) method, a mean absolute difference (MAD) method or a normalized cross-correlation (NCC) method.

The selector 147-2 may output each bitstream EBS1 or EBS2 as an output bitstream EBS in response to the selection signal SEL. For example, when a selection signal SEL related to the first encoded bitstream EBS1 is received from the comparator 147-1, the selector 147-2 outputs the first encoded bitstream EBS1 as the output bitstream EBS according to the selection signal SEL.

However, when a selection signal SEL related to the second encoded bitstream EBS2 is received from the comparator 147-1, the selector 147-2 outputs the second encoded bitstream EBS2 as the output bitstream EBS according to the selection signal SEL.

Figure 4:
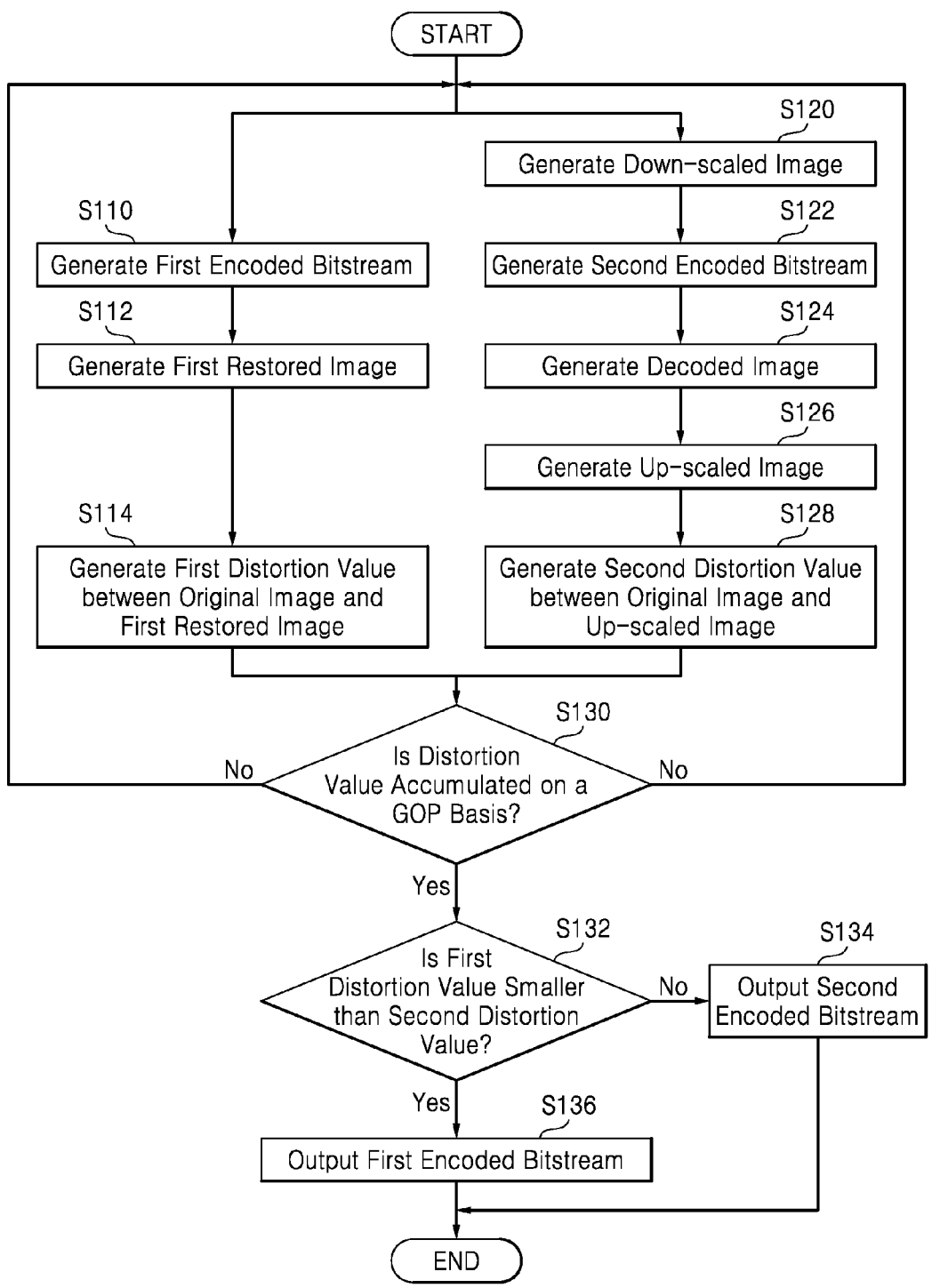
FIG. 4 is a flowchart for describing an operation of the encoding device illustrated in FIG. 3.

FIG. 4 is a flowchart for describing an operation of the encoding device illustrated in FIG. 3. Referring to FIGS. 3 and 4, the first internal encoder circuit 143-1 may generate the first encoded bitstream EBS1 using the original image OIM output from a video source (not shown) at a step S110. The first encoded bitstream EBS1 may have a resolution the same as the first resolution of the original image OIM. The first encoded bitstream EBS1 may be changed based on the target bit rate TBR.

At a step S112, the first internal-decoder circuit 143-2 may generate the first restored image RIM1 which corresponds to the first encoded bitstream EBS1 and has a resolution the same as the first resolution of the original image OIM.

At a step S114, the comparator 147-1 may generate a first distortion value or a first difference value between the first restored image RIM1 and the original image OIM. The first distortion value may be accumulated on a group of picture (GOP) basis. The distortion value may be computed (or calculated) in a sum of absolute differences (SAD) method, a sum of squared differences (SSD) method, a mean absolute difference (MAD) method, or a normalized cross-correlation (NCC) method.

At a step S120, the down scaler 145-1 may generate a down-scaled image DIM1 having a resolution different from the first resolution using the original image OIM output from the video source. At a step S122, the second internal-encoder circuit 145-2 may generate the second encoded bitstream EBS2 from the down-scaled image DIM1. The second encoded bitstream EBS2 may be changed based on the target bit rate TBR.

At a step S124, the second internal-decoder circuit 145-3 may generate a decoded image DCIM1 using the second encoded bitstream EBS2. At a step S126, the up-scaler 145-4 may generate the up-scaled image RIM2 having the first resolution using the decoded image DCIM1.

At a step S128, the comparator 147-1 may compute a second distortion value or a second difference value between the up-scaled image RIM2 and the original image OIM.

At a step S130, each of the first distortion value and the second distortion value may be accumulated on a GOP basis. At a step S132, the comparator 147-1 may select the smaller one of the first distortion value and the second distortion value. For example, when the first distortion value is smaller than the second distortion value, step S136 may be performed. However, when the second distortion value is smaller than the first distortion value, step S134 may be performed.

At the step S134, when the second distortion value is smaller than the first distortion value, the second encoded bitstream EBS2 related to the second distortion value has the best image quality. Accordingly, the comparator 147-1 outputs a selection signal SEL for outputting the second encoded bitstream EBS2 related to the second distortion value to the selector 147-2.

At a step S136, when the first distortion value is smaller than the second distortion value, the first encoded bitstream EBS1 related to the first distortion value may have the best image equality. Accordingly, the comparator 147-1 outputs a selection signal SEL for outputting the first encoded bitstream EBS1 related to the first distortion value to the selector 147-2. The steps S110 to S136 may be image processing operations of a device providing video hosting services.

Figure 5:
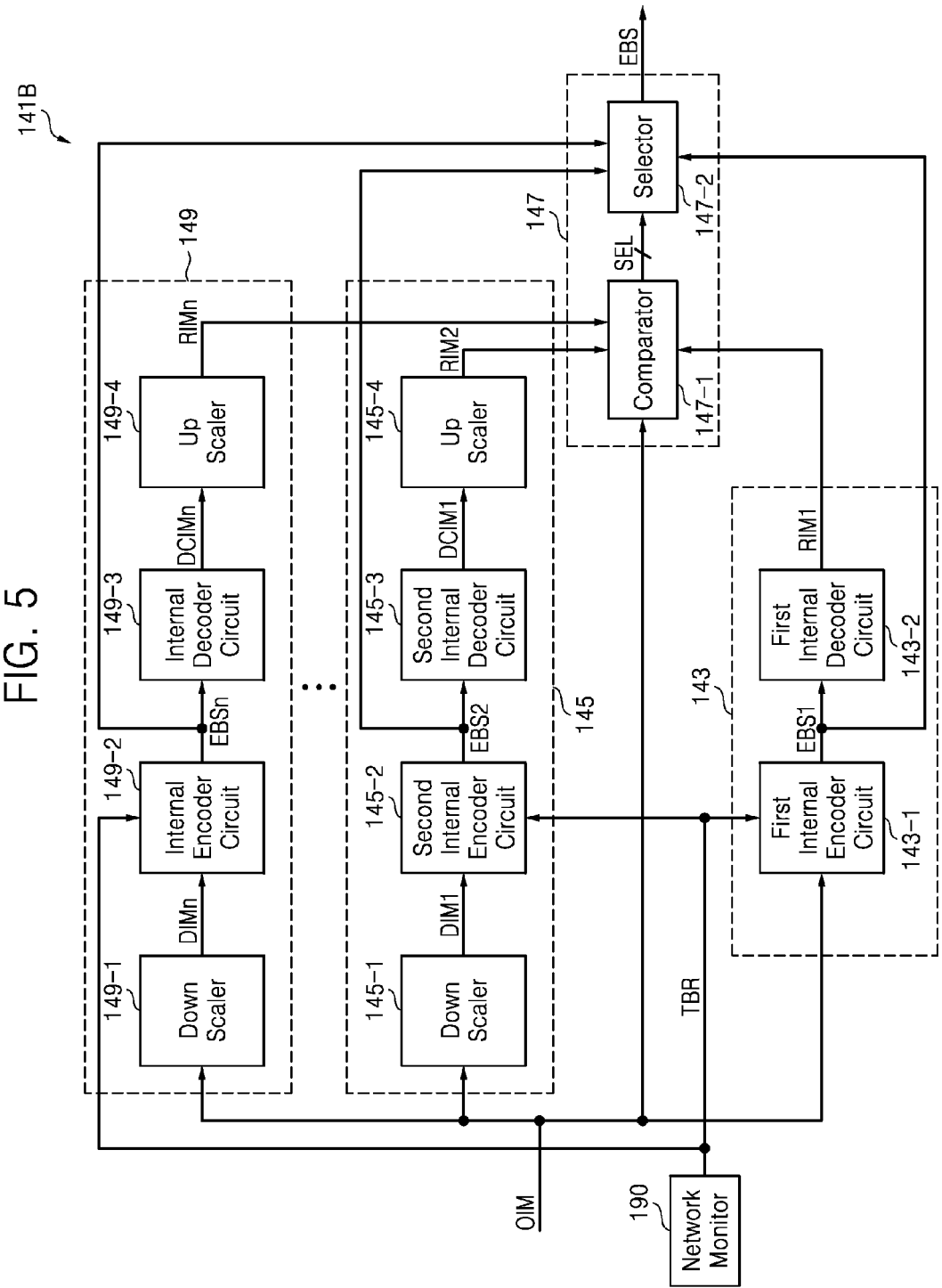
FIG. 5 is a block diagram according to another example embodiment of the encoding device illustrated in FIG. 1.

FIG. 5 is a block diagram according to another example embodiment of the encoding device illustrated in FIG. 1. Referring to FIG. 5, an encoding device 141B according to another example embodiment of the encoding device 141 illustrated in FIG. 1 may be included in the video processing circuit 140 illustrated in FIG. 1.

The encoding device 141B includes a first encoding circuit 143, a second encoding circuit 145, at least one additional encoding circuit 149, and an output circuit 147. The first encoding circuit 143 and the second encoding circuit 145 have substantially the same structure and operation as the first encoding circuit 143 and the second encoding circuit 145 illustrated in FIG. 3, so that detailed description thereof will be omitted.

At least one additional encoding circuit 149 includes a down-scaler 149-1, an internal-encoder circuit 149-2, an internal-decoder circuit 149-3, and an up-scaler 149-4. Except a down-scaling ratio of each down-scaler 145-1 and 149-1, the additional encoding circuit 149 has substantially the same structure and operation as the second encoding circuit 145.

The number of additional encoding circuits 149 included in the encoding circuit 141B may be determined according to a design specification. The down-scaler 149-1 may generate a down-scaled image DIMn having a resolution different from the first resolution. For example, when the first resolution is assumed to be 1920*1088, the down-scaler 149-1 may generate a down-scaled image DIMn having a down-scaled resolution, i.e., 480*272. For example, each down-scaler 145-1, . . . , 149-1 may generate a down-scaled image DIM1, . . . , DIMn having a different resolution at an identical time or a different time.

The internal-encoder 149-2 generates an encoded bitstream EBSn from the down-scaled image DIMn. The encoded bitstream EBSn may be changed based on the target bit rate TBR transmitted from the network monitor 190. The internal-decoder 149-3 may generate a decoded image DCIMn using the encoded bitstream EBSn.

The up-scaler 149-4 may generate an up-scaled image RIMn having the first resolution using the decoded image DCIMn.

The output circuit 147 includes the comparator 147-1 and the selector 147-2. The comparator 147-1 may compute difference values between each of the plurality of restored images RIM1, RIM2, . . . , RIMn and the original image OIM, and generate selection signals SEL for selecting an encoded bitstream related to the minimum difference value among the difference values.

The number of selection signals SEL may be determined according to the number of encoding circuits 143, 145, . . . , 149.

The plurality of restored images RIM1, RIM2, . . . , RIMn include the first restored image RIM1 and a plurality of up-scaled images RIM2, . . . , RIMn.

The selector 147-2 may output one of the plurality of encoded bitstreams EBS1, EBS2, . . . , EBSn as an output bitstream EBS in response to selection signals SEL.

For example, when selection signals SEL related to an encoded bitstream EBSn are received from the comparator 147-1, the selector 147-2 may output the encoded bitstream as the output bitstream EBS according to the selection signals SEL.

Figure 6:
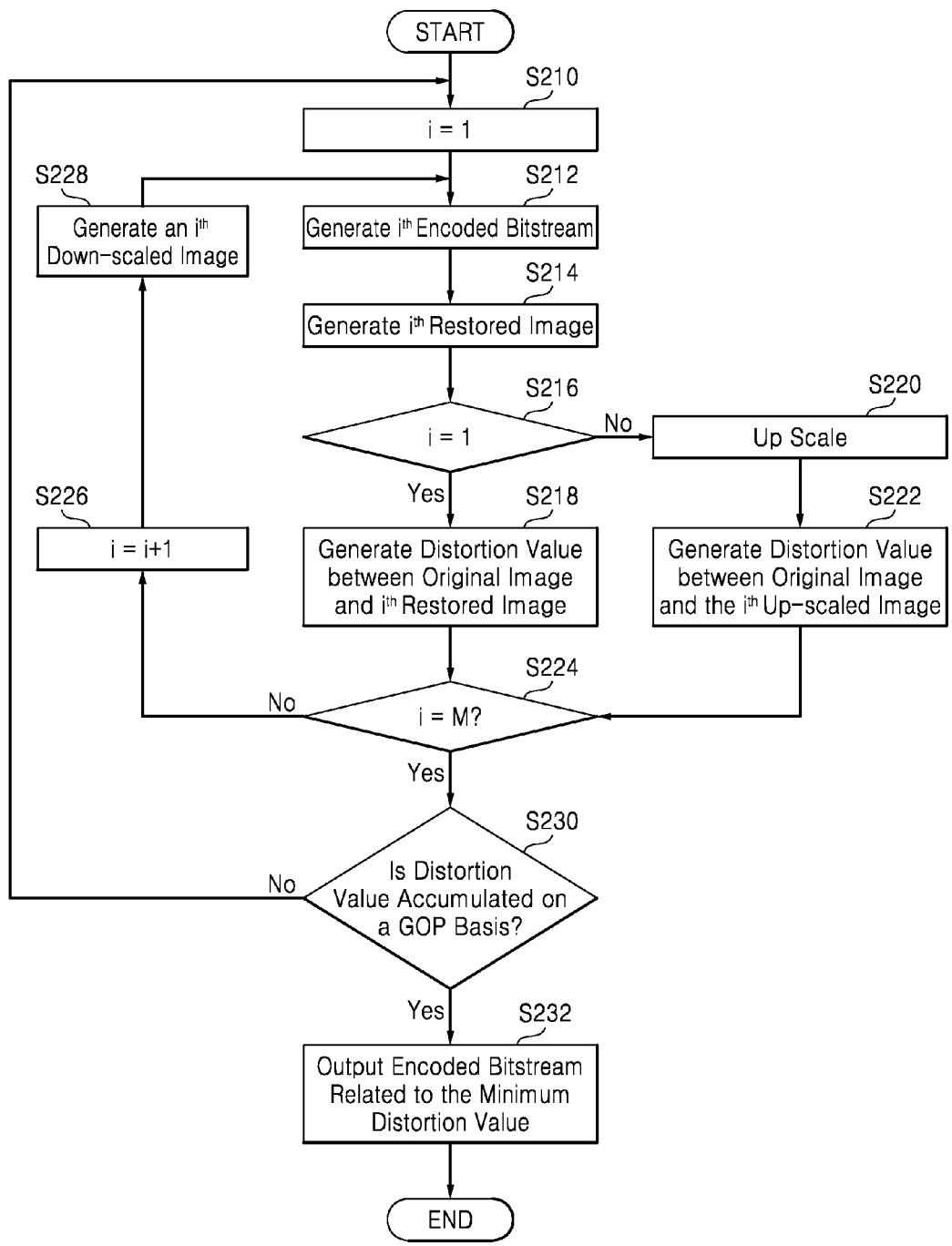
FIG. 6 is a flowchart for describing an operation of the encoding device illustrated in FIG. 5.

FIG. 6 is a flowchart for describing an operation of the encoding device illustrated in FIG. 5. Referring to FIGS. 5 and 6, a value of a sequential encoding count i, where i is equal to or greater than 1 and equal to or smaller than n, is initialized to "1" at a step S210.

At a step S212, the encoding device 141B may generate a $i^{th}$ encoded bitstream EBSi using the original image OIM output from a video source. For example, when a value of "i" is "1", the internal-encoder circuit 143-1 generates the first encoded bitstream EBS1, and when a value of "i" is "2", the internal-encoder circuit 145-2 generates the second encoded bitstream EBS2.

The $i^{th}$ encoded bitstream EBSi may be changed based on a corresponding target bit rate TBR. When a value of "i" is "1", the first encoded bitstream EBS1 is irrelevant to down-scaling, so that the first encoded bitstream may be encoded with a resolution the same as the first resolution of the original image OIM. When the value of "i" is not "1", an encoding is performed after a down-scaled image is generated at a step S228, so that a resolution of the $i^{th}$ encoded bitstream EBSi may be lower than the first resolution of the original image OIM.

At a step S214, an $i^{th}$ restored image RIMi may be generated using the $i^{th}$ encoded bitstream EBSi. When the value of "i" is "1", the first restored image RIM1 is generated. When the value of "i" is "2", the second restored image RIM2 is generated. In more detail, an $i^{th}$ decoded image DCIMi is generated using the $i^{th}$ encoded bitstream EBSi. The $i^{th}$ decoded image DCIMi may be related to the $i^{th}$ restored image RIMi.

At a step S216, it is determined whether the value of "i" is one (1). When the value of "i" is one, step S218 is performed, and when the value of "i" is not one, step S220 is performed.

At the step S218, when the value of "i" is one, a distortion value between the original image OIM and the first restored image RIM1 is computed. A resolution of the first restored image RIM1 is the same as the first resolution of the original image OIM, so that an up-scaling process is not performed. A method of generating a distortion value is the same as a method described in FIGS. 3 to 5, and thereby a detailed description is omitted. At a step S220, when the value of "i"

is not one, an $i^{th}$ up-scaled image RIMi having the first resolution of the original image OIM is generated using an $i^{th}$ decoded image RCIMi.

At a step S222, the comparator 147-1 computes a distortion value between the original image OIM and the $i^{th}$ up-scaled image RIMi.

At a step S224, it is determined whether the value of "i" is the same as a value of a prescribed resolution count "M", where M is a natural number equal to or more than two. The resolution count M means the number of images having different resolutions when the encoding device 141B encodes the original image OIM with different resolutions. When the value of "i" is M, the encoding device 141B performs a step S230, and when the value of "i" is not M, e.g., when i is smaller than M, the encoding device 141B performs a step S226.

For example, when the value of "i" is one and a value of the resolution count M is two, the original image OIM needs to be encoded into two images each having a different resolution, so that the encoding device 141B performs the step S226 to perform an encoding once more to an image having a lower resolution by changing the value of "i".

When the value of i is two and the value of the resolution count M is two, the original image OIM means completion in encoding two images each having a different resolution, so that the encoding device 141B performs a step S230. At a step S226, a value of an encoding count i is increased as much as one at the step S226.

At a step S228, the encoding device 141B generates an $i^{th}$ down-scaled image. For example, when the value of the encoding count i is two, the encoding device 141B generates a second down-scale image by down-scaling the original image OIM according to a down-scale ratio according to the value of "i". The generated second down-scale image is used in generating the second encoded bitstream EBS2 at the step S212.

At a step S230, the comparator 147-1 determines whether a distortion value is accumulated on a GOP basis. In order to compare differences between distortion values by resolution, the encoding device 141B may accumulate a distortion value on a GOP basis. At a step 232, the encoding device 141B may output a bitstream related to the minimum distortion value among distortion values of a plurality of encoded bitstreams EBS each having a different resolution.

Figure 7:
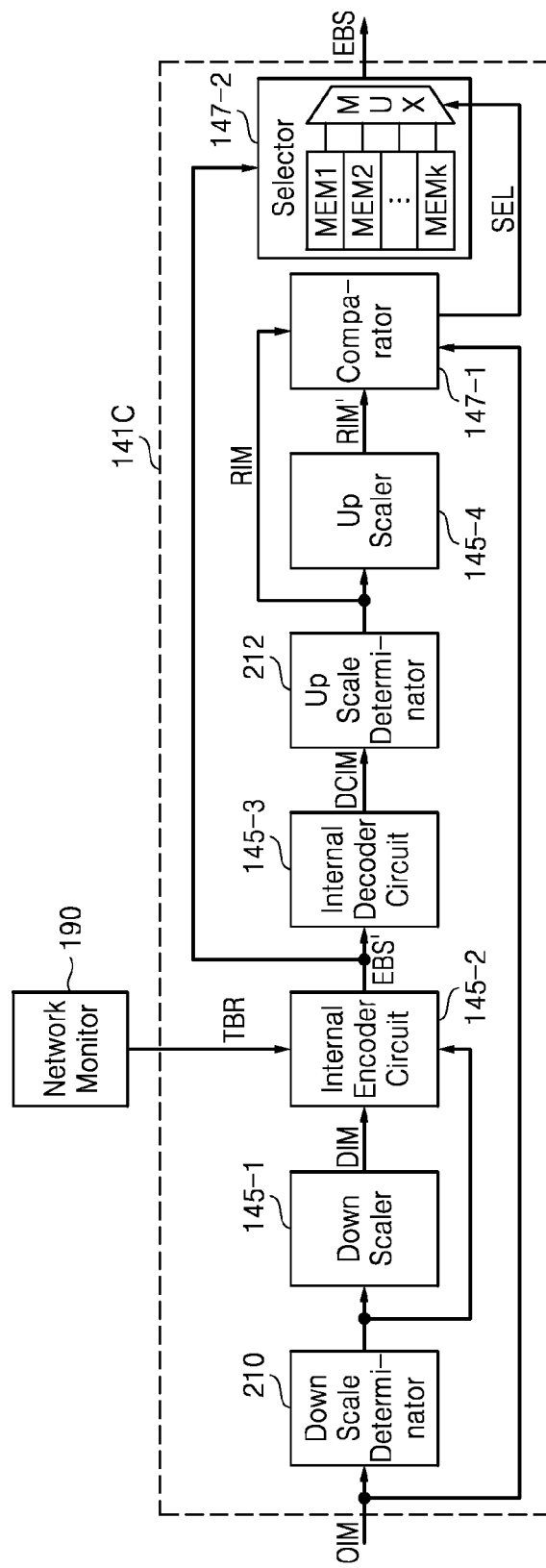
FIG. 7 is a block diagram of the encoding device which may perform a sequential encoding method according to the flowchart illustrated in FIG. 6.

FIG. 7 is a block diagram of the encoding device which may perform a sequential encoding method according to the flowchart illustrated in FIG. 6. Referring to FIG. 7, an encoding device 141C according to still another example embodiment of the encoding device 141 illustrated in FIG. 1 may be included in the video processing circuit 140 illustrated in FIG. 1.

The encoding device 141C includes a down-scale determinator 210, a down-scaler 145-1, an internal-encoder circuit 145-2, an internal-decoder circuit 145-3, an up-scale determinator 212, an up-scaler 145-4, a comparator 147-1, and a selector 147-2. The encoding device 141C may be connected to the network monitor 190.

The down-scaling determinator 210 determines whether to down-scale the original image OIM. The down-scale determinator 210 may determine whether to perform a down-scale operation according to the value of the encoding count i described in FIG. 6. For example, when the value of the encoding count i is one (1), the encoding device 141C encodes the original image OIM without down-scaling the original image OIM.

When the value of the encoding count i is two (2) and the first resolution is 1920*1088, the encoding device 141C may down-scale the original image OIM with a resolution, i.e., 960*544, which is lower than the first resolution of the original image OIM, and encode the down-scaled image. Accordingly, the down-scale determinator 210 detects a value of the encoding count, determines whether to perform a down-scale operation according to a result of the detection, generates down-scaling information related to whether or not to perform the down-scale operation, and outputs both the information and the original image OIM.

The down-scaler 145-1 generates a down-scaled image DIM using down-scaling information and the original information OIM received from the down-scale determinator 210. For example, when the first resolution of the original image OIM is 1920*1088 and the value of the encoding count i is one, the down-scaler 145-1 outputs the original image OIM as it is without down-scaling the original image OIM.

However, when the value of the encoding count i is two, the down-scaler 145-1 may down-scale the original image OIM to a resolution, i.e., 960*544, which is lower than the first resolution of the original image OIM, and output the down-scaled image DIM to the internal-encoder circuit 145-2.

The internal-encoder circuit 145-2 may generate an encoded bitstream EBS' using the original image OIM or the down-scaled image DIM according to the encoding count i. The encoded bitstream EBS' is transmitted to the selector 147-2 and the internal-decoder circuit 145-3. The encoded bitstream EBS' may be changed based on the target bit rate TBR transmitted from the network monitor 190.

The internal-decoder circuit 145-3 generates a decoded image DCIM using the encoded bitstream EBS'. The generated decoded image DCIM is output to the up-scale determinator 212.

The up-scale determinator 212 may determine whether to perform an up-scale operation according to the value of the encoding count i. When determining the up-scale operation is necessary for the decoded image DCIM, the up-scale determinator 212 transmits the decoded image DCIM to the up-scaler 330. However, when determining the up-scale operation is not necessary for the decoded image DCIM, the up-scale determinator 212 transmits the decoded image DCIM to the comparator 147-1 as the restored image RIM.

For example, when the first resolution of the original image OIM is 1920*1088 and the value of the encoding count i is one, the decoded image DCIM has the same resolution as the original image OIM, so that the up-scale operation is not necessary. Accordingly, the up-scale determinator 212 recognizes the decoded image DCIM as the restored image RIM, and outputs the decoded image DCIM to the comparator 147-1 as the restored image RIM. However, when the value of the encoding count i is two, the decoded image DCIM is down-scaled to a resolution, i.e., 960*544, the up-scale operation is necessary. The up-scale determinator 212 outputs the decoded image DCIM to the up-scaler 145-4.

The up-scaler 145-4 generates an image RIM' up-scaled with the first resolution of the original image OIM, i.e., a restored image RIM', and outputs the image RIM' to the comparator 147-1 by applying an up-scale ratio set in advance according to the value of the encoding count i.

The comparator 147-1 receives and stores each of the restored image RIM' output from the up-scaler 145-4 and the restored image RIM output from the up-scale determinator 212.

The comparator 147-1 may compute difference values between each of the plurality of restored images RIM and RIM' and the original image OIM while additionally managing a memory for storing the restored image RIM, and generate selection signals SEL related to the minimum difference value among the difference values. The plurality of restored images RIM and RIM' includes the restored image RIM output from the up-scale determinator 212 and the up-scaled image RIM' output from the up-scaler 145-4. The up-scaled image RIM' may include a plurality of up-scaled images.

The selector 147-2 includes a plurality of memories MEM1, MEM2, . . . , MEMk and a multiplexer MUX. The selector 147-2 stores the encoded bitstream EBS' received from the internal-decoder circuit 145-2 in a corresponding memory, i.e., one of MEM1 to MEMk. The multiplexer MUX outputs the encoded bitstream EBS' stored in one of the memories MEM1 to MEMk in response to the selection signals SEL received from the comparator 147-1.

For example, when the selector 147-2 receives the selection signals SEL related to the first encoded bitstream from the comparator 147-1, the multiplexer MUX outputs the first encoded bitstream stored in a first memory MEM1 according to the received selection signals SEL.

When the selector 147-2 receives selection signals SEL related to the second encoded bitstream from the comparator 147-1, the multiplexer MUX outputs the second encoded bitstream stored in a second memory MEM2 according to the received selection signals SEL.

When an encoded bitstream having an optimum resolution is selected on a GOP basis by additionally managing memories MEM1 to MEMk for storing the encoded bitstream EBS', the selector 147-1 may output a corresponding encoded bitstream as an output encoded bitstream EBS and initialize the memories MEM1 to MEMk for a following GOP.

Figure 8:
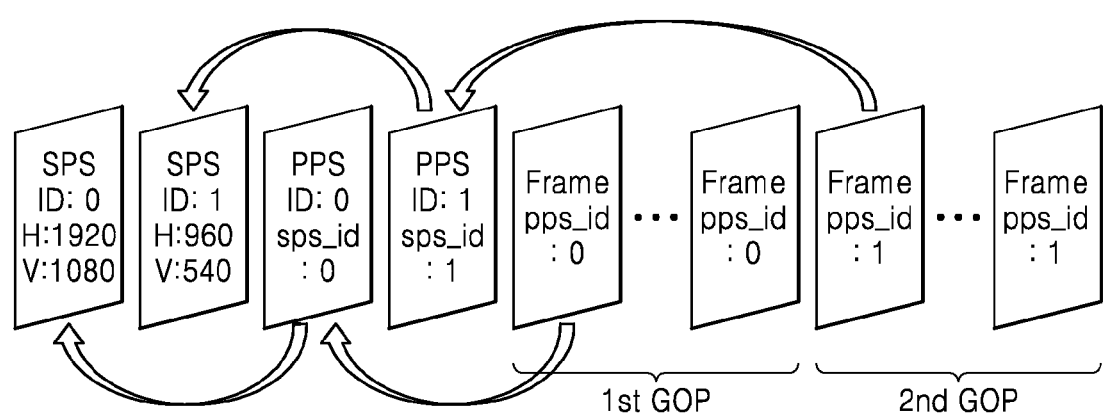
FIG. 8 is a drawing for describing a configuration of an output encoded bitstream.

FIG. 8 is a drawing for describing a configuration of an output encoded bitstream. Referring to FIG. 8, a sequence parameter set (SPS) and a picture parameter set (PPS) are headers of a bitstream configured from a set of parameters notifying information necessary for a decoding.

For example, the SPS includes information such as profile of video standard, e.g., H.264, resolution as entire coding information on sequence such as level, and video format. For example, referring to FIG. 8, when a value of identification information (ID) of the SPS is zero, a resolution of a corresponding frame during performing a decoding is 1920*1080. When the value of the identification information (ID) of the SPS is one, the resolution of the corresponding frame during performing the decoding is 960*540.

The PPS includes contents which is more detailed than contents defined by the SPS, i.e., coding information of a picture used in an entire file, i.e., a parameter applied in a decoded picture. Data of the PPS are valid until a new PPS comes out for an information change. For example, when an identification information (ID) value of the PPS is zero, an identification information (ID) value of the SPS is zero, and a decoding is performed using decoding parameters included in a header corresponding to the PPS and SPS.

When the identification information (ID) value of the PPS is one, the identification information (ID) value of the SPS is one, and a decoding is performed using parameters included in a header corresponding to the PPS and the SPS. Next to header information of the SPS and the PPS, information on a frame or a picture where the original image OIM is encoded is transmitted.

Information on the encoded frame includes information on the original image OIM and identification information of a PPS pps_id to be used during a decoding. A fixed unit, i.e., a plurality of frames, is defined as a Group of Picture (GOP).

In inventive concepts, a resolution may vary by GOP. An identical GOP has the same PPS information. For example, as illustrated in FIG. 8, a pps_id value of each frame in a first GOP is zero. When the pps_id is zero, a sps_id is zero. The resolution obtained thereby is 1920*1080. Accordingly, each frame included in the first GOP is decoded with the resolution of 1920*1080.

The pps_id value of each frame of a second GOP is one. When the pps_id is one, the sps_id is one. The resolution obtained thereby is 960*540. Accordingly, each frame included in the second GOP is decoded with the resolution of 960*540.

Figure 9:
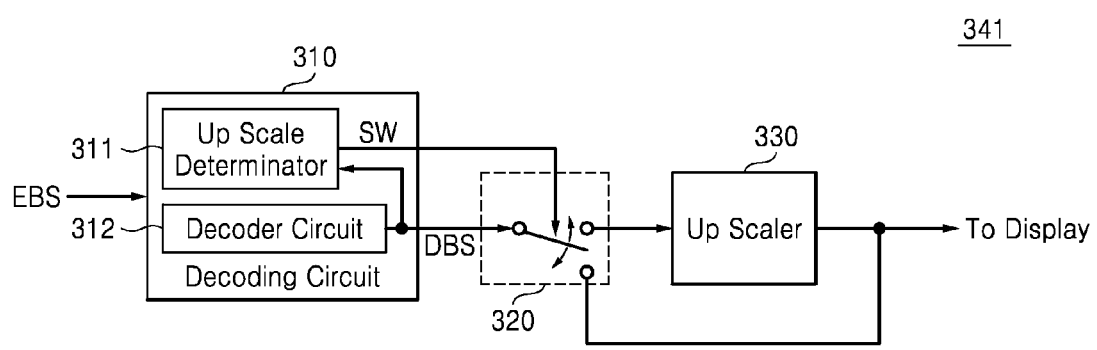
FIG. 9 is a block diagram of a decoding device according to an example embodiment of incentive concepts.

FIG. 9 is a block diagram of a decoding device according to an example embodiment of incentive concepts. Referring to FIG. 9, a decoding device 341 may decode an output bitstream EBS output from the encoding device 141A, 141B, or 141C illustrated in FIG. 3, 5, or 7.

Figure 13:
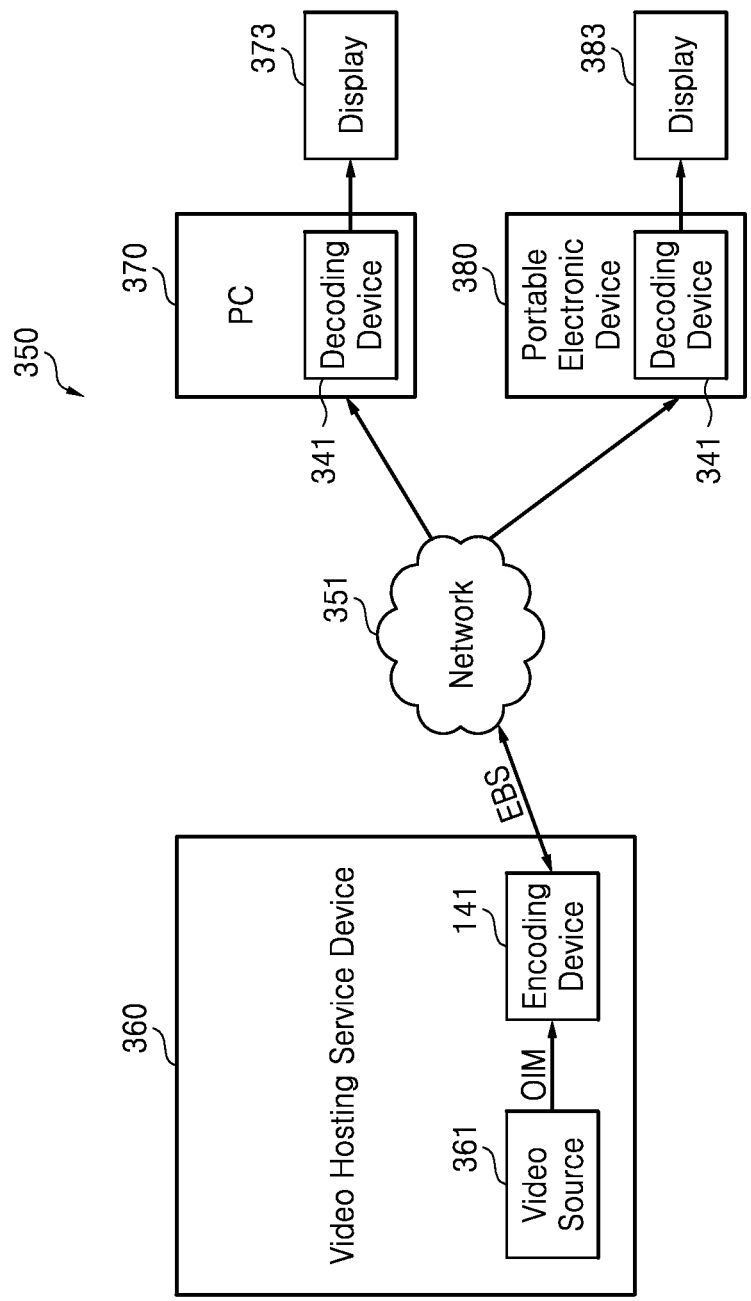
FIG. 13 is a block diagram illustrating an example embodiment of a system including an encoding device and a decoding device according to an example embodiment of inventive concepts.

According to an example embodiment, the decoding device 341 may be included in the display 101 illustrated in FIG. 1 or a personal computer (PC) and a portable electronic device illustrated in FIG. 13. According to an example embodiment, the decoding device 341 includes a decoding circuit 310, a switch 320, and an up-scaler 330.

The decoding device 341 may be hardware, firmware, hardware executing software or any combination thereof. When the decoding device 341 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the decoding device 341. CPUs, DSPs, ASICs and FPGAs may generally be referred to as processors and/or microprocessors.

In the event where the decoding device 341 is a processor executing software, the CPU 110 is configured as a special purpose machine to execute the software to perform the functions of the decoding device 341.

The decoding device 310 includes a decoder circuit 312 and an up-scale determinator 311.

The decoder circuit 312 decodes the encoded bitstream EBS and generates a decoded bitstream DBS. The decoded bitstream DBS may be the same as a decoded image DCIM1 or DCIMn. When describing an operation of each component, the decoder circuit 312 decodes the encoded bitstream EBS to generate the decoded bitstream DBS.

The upscale determinator 311 extracts and stores a resolution of the decoded bitstream DBS by parsing the decoded bitstream DBS, compares a resolution of the extracted decoded bitstream DBS with an initial resolution included in a header of the decoded bitstream DBS, and generates a switch signal SW according to a result of the comparison.

For example, when a resolution of the decoded bitstream DBS is the same as a resolution of the original image OIM, the upscale determinator 311 generates the switch signal SW for transmitting the decoded bitstream DBS to the display, and when the resolution of the decoded bitstream DBS is different from the resolution of the original image OIM, the upscale determinator 311 generates the switch signal SW for transmitting the decoded bitstream DBS to the up-scaler 330.

Based on the switch signal SW, the switch 320 bypasses a decoded image, i.e., the decoded bitstream DBS to the display or transmits the decoded image to the up-scaler 330. The up-scaler 330 generates an up-scaled image by up-scaling the decoded bitstream DBS with the resolution of the original image, and transmits the up-scaled image to the display device.

Figure 10:
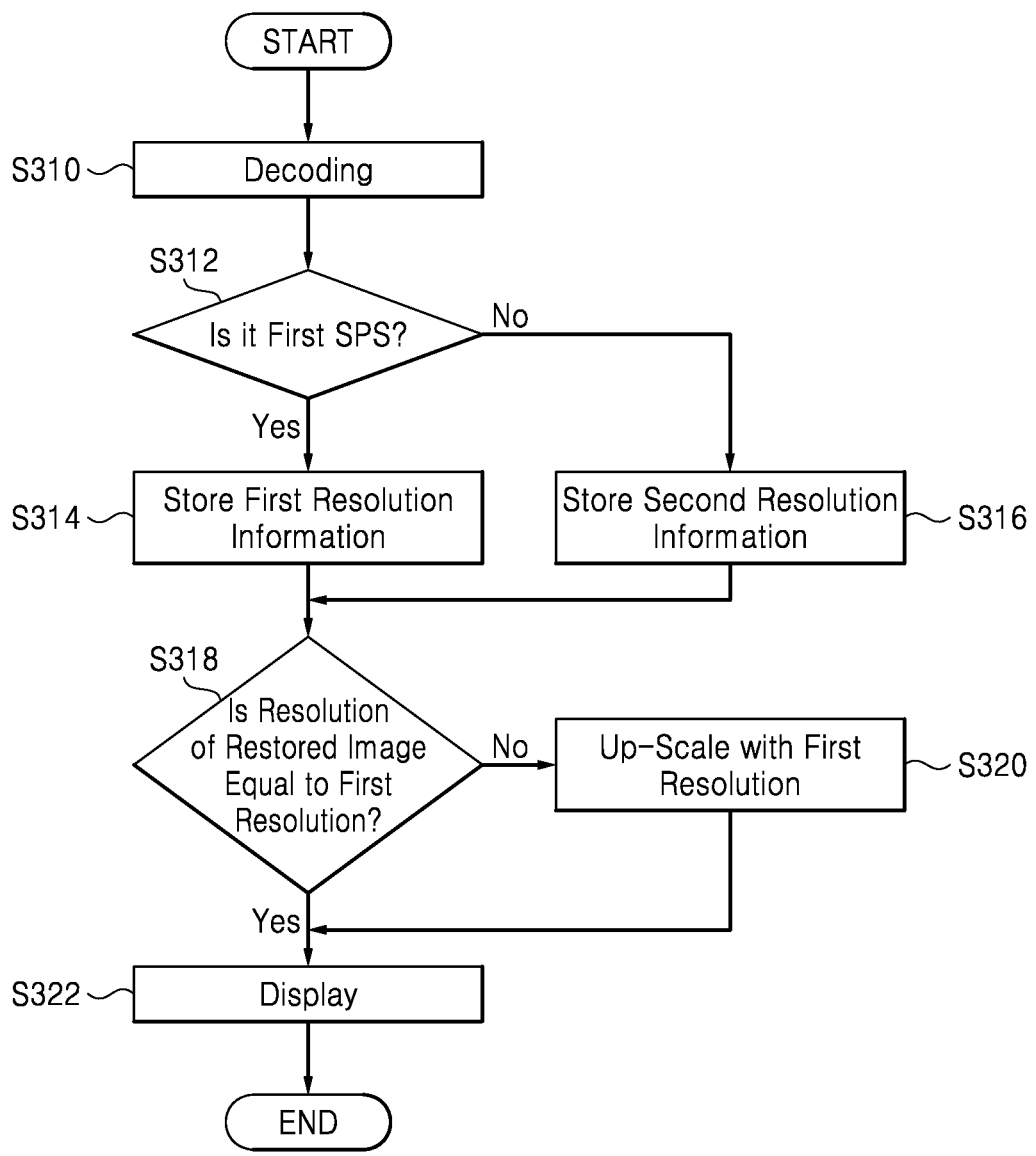
FIG. 10 is a flowchart for describing an example embodiment of a decoding method performed in the decoding device of FIG. 9.

FIG. 10 is a flowchart for describing an example embodiment of a decoding method performed in the decoding device of FIG. 9. Referring to FIGS. 9 and 10, the decoded bitstream DBS is generated by decoding the encoded bitstream EBS transmitted from outside of the decoding device 341 at a step S310.

At a step S312, the decoding circuit 310 determines whether the SPS included in the header information of the decoded bitstream (or decoded image DBS) is a first SPS. The first SPS (hereinafter, a first SPS) includes information on the resolution of the original image. When the SPS included in the header information is the first SPS, step S314 is performed, and when the SPS is not the first SPS, step S316 is performed.

At the step S314, the decoding circuit 310 stores resolution information of the first SPS as first resolution information. At the step S316, the decoding circuit 310 stores resolution information of the first SPS as second resolution information.

At a step S318, the decoding circuit 310 determines whether a resolution of the decoded bitstream DBS is the same as the first resolution. When the resolution of the decoded bitstream DBS is the same as the first resolution, i.e., the resolution of the original image, the decoded bitstream DBS is a restored image having the resolution of the original image, and the decoded bitstream DBS at a step S322 is displayed on the display. When the resolution of the decoded bitstream DBS is not the same as the first resolution, step S320 is performed.

At a step S320, the up-scaler 330 up-scales the decoded bitstream DBS to generate a restored image having the same resolution as the first resolution of the original image. At the step S322, the restored image transmitted from the up-scaler 330 is output to the display.

Figure 11:
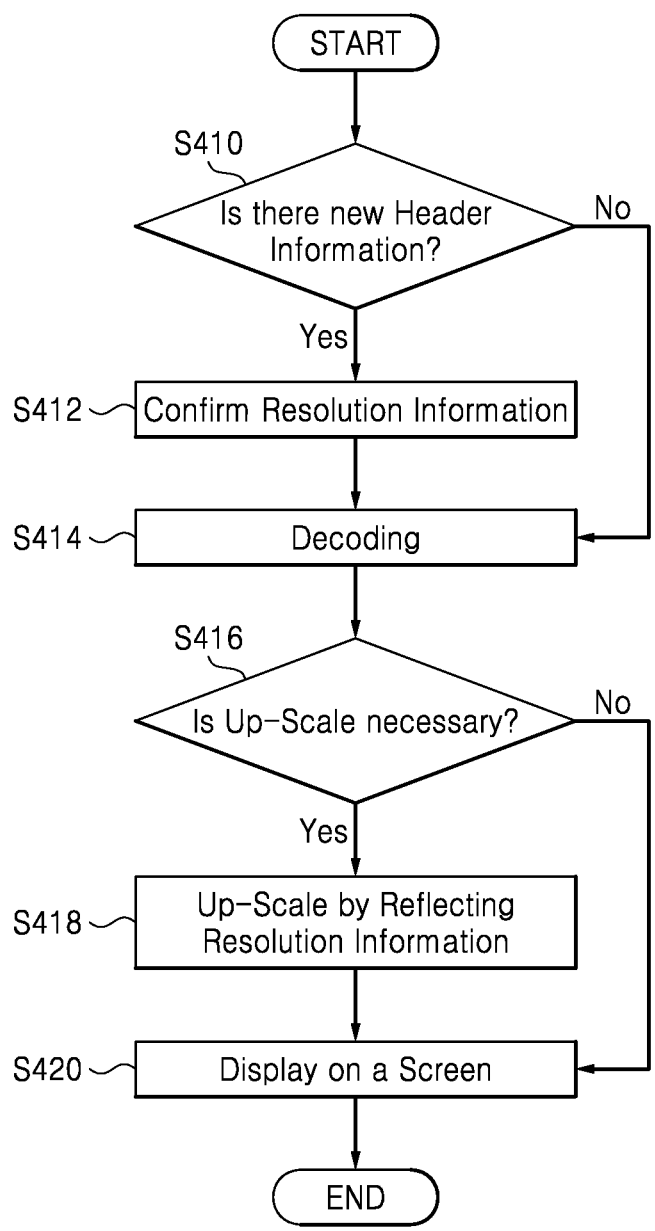
FIG. 11 is a flowchart for describing another example embodiment of the decoding method performed in the decoding device of FIG. 9.

FIG. 11 is a flowchart for describing another example embodiment of the decoding method performed in the decoding device of FIG. 9. Referring to FIGS. 1, 9, and 11, when a resolution of an output bitstream EBS is not the same as the resolution of the original image OIM when performing an encoding, the encoding device 141 may transmit the resolution of the original image OIM or the up-scale ratio on a GOP basis to the decoding device 341 through other header information, e.g., Video Usability Information (VUI) which is a type of additional header information defined by a H.264 standard.

The encoding device 141 may transmit the resolution and/or the up-scale ratio to the decoding device 341 using a bit which is not currently used in the VUI or other headers, e.g., a reserved bit for a future usage.

At a step S410, the decoder circuit 310 determines whether there is new header information in the received encoded bitstream EBS. For example, the decoder circuit 310 may determine whether new header information is included in the encoded bitstream EBS on a GOP basis.

When the new header information is included, the decoder circuit 310 performs a step S412, and when the new header information is not included, the decoder circuit 310 performs a step S414.

At the step S412, the decoder circuit 310 detects resolution information included in the header information. When new header information is included in the encoded bitstream EBS on a GOP basis, the decoder circuit 310 may detect and store the resolution or the up-scale ratio of the original image by parsing a portion of the encoded bitstream EBS. Whether to perform an up-scale operation on a decoded image of a corresponding GOP and the up-scale ratio will be described at a step S416.

At the step S414, the decoding circuit 310 decodes the encoded bitstream EBS to generate the decoded bitstream or the decoded image DBS. At the step S416, the decoding circuit 310 determines whether an up-scale operation is needed. Whether to perform the up-scale operation is determined referring to the resolution and/or the up-scale ratios obtained at the step S412.

For example, when there is no new header information on a corresponding GOP, a resolution of the encoded bitstream EBS has the same resolution as the original image OIM, and thereby an additional up-scale operation is not needed after performing a decoding on the encoded bitstream EBS. Here, the decoded image DBS may be a restored image.

However, when there is new header information on the corresponding GOP, and the up-scale ratio information is detected at the step S412, the up-scaler 330 may generate a restored image having the same resolution as the resolution of the original image OIM by up-scaling the decoded image DBS. When the up-scale operation needs to be performed as a result of determining on whether the up-scale operation is necessary, the decoding device 341 performs the step S418, and when the up-scale operation is not necessary, the decoding device 341 performs a step S420.

At the step S418, the up-scaler 330 proceeds with an up-scale operation on the decoded image DBS based on the resolution obtained at the step S412. The decoded image where the up-scale operation is performed may be a restored image. At a step S450, the restored image is displayed on the display.

Figure 12:
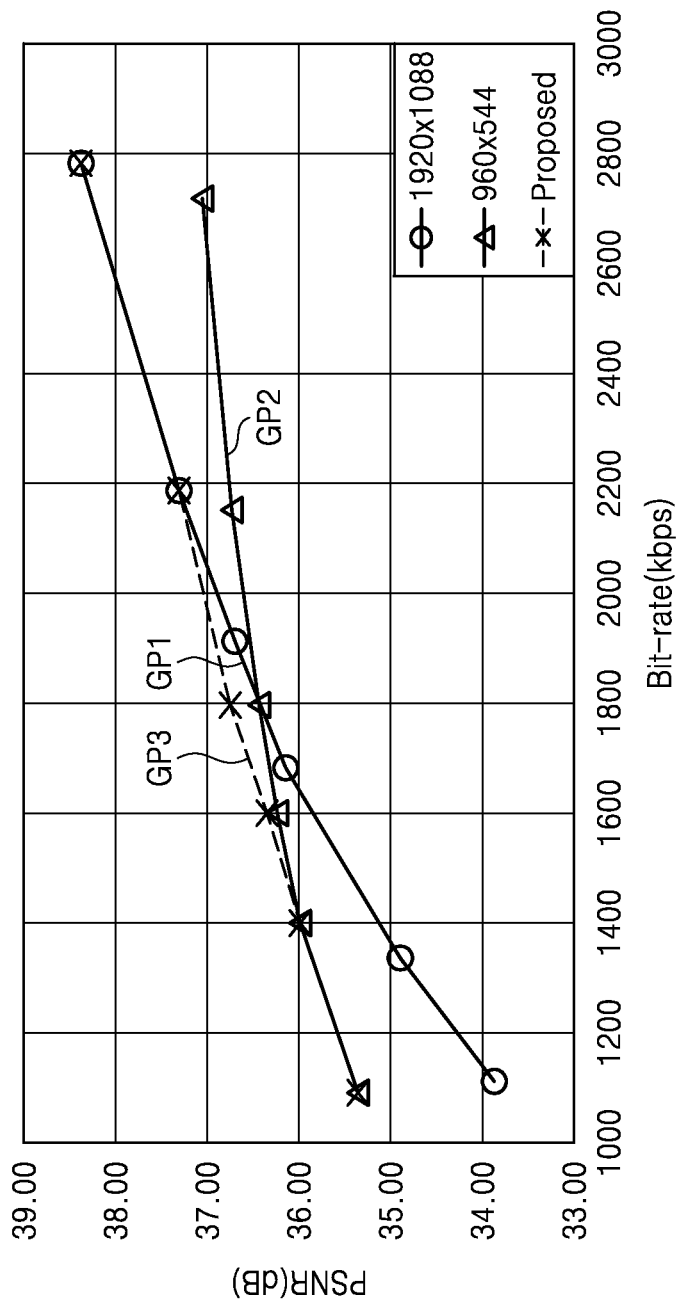
FIG. 12 is a graph for describing a performance of the encoding device illustrated in FIG. 1.

FIG. 12 is a graph for describing a performance of the encoding device illustrated in FIG. 1. Referring to FIG. 12, a graph GP3 is a graph of image quality when an original image is encoded by the encoding device 141 of FIG. 1.

As illustrated in FIG. 12, the original image is encoded with a down-scaled low resolution, e.g., 960*544, at a low bit rate, and encoded with the original resolution, e.g., 1920*1088, at a high bit rate. Accordingly, the encoding device 141 may obtain a high image quality at entire bit rates.

In a specific section, e.g., 1600 kbps to 2000 kbps, a portion encoded with a resolution the same as the resolution of the original image is mixed with a portion encoded with a down-scaled low resolution in a certain unit, e.g., on a GOP basis, so that the encoding device 141 may provide an image having a higher image quality than when the original image is encoded with one resolution.

When the encoding device 141 outputs an encoded bitstream having a lower resolution than the resolution of the original image, the decoding device 341 may decode an encoded bitstream within a shorter period of time, so that power consumption of the decoding device 341 may be reduced.

FIG. 13 is a block diagram illustrating an example embodiment of a system including an encoding device and a decoding device according to an example embodiment of inventive concepts. Referring to FIGS. 1 and 13, an image processing system 350 includes a video hosting service device 360, a first device 370, and a second device 380.

The first device 370 may be embodied in a PC, and the second device 380 may be embodied in a portable electronic device. Each of devices 360, 370, and 380 may communicate with each other through a network 351. According to an example embodiment, the architecture of the network 351 may be variously modified. For example, the network 351 may be embodied in a wire internet, a wireless internet, or a mobile communication network.

The video hosting service device 360 includes the video source 361 and the encoding device 141. The encoding device 141 means the encoding device 141 illustrated in FIG. 1. The encoding device 141 receives the original image OIM from the video source 361. The encoding device 141 encodes the original image OIM to generate the encoded bitstream EBS. The encoded bitstream EBS is transmitted to the first device 370 and the second device 380 through the network 351.

The encoded bitstream EBS transmitted to the network 351 may be transmitted to the first device 370 and/or the second device 380. Each device 370 and 380 may be embodied as a personal computer, a mobile phone, a smart phone, a tablet PC, a laptop computer, a personal digital assistant (PDA), an enterprise digital assistant (EDA), a portable multimedia player (PMP), a personal navigation device or portable navigation device (PDN), a handheld game console, a mobile internet device (MID), a wearable computer, or an e-book.

The first device 370 includes the decoding device 341 and a display 373, and the second device 380 includes the decoding device 341 and a display 383. Each decoding device 341 receives and decodes the encoded bitstream EBS transmitted from the network 351, and outputs the decoded image to a corresponding display 373 and 383.

Figure 14:
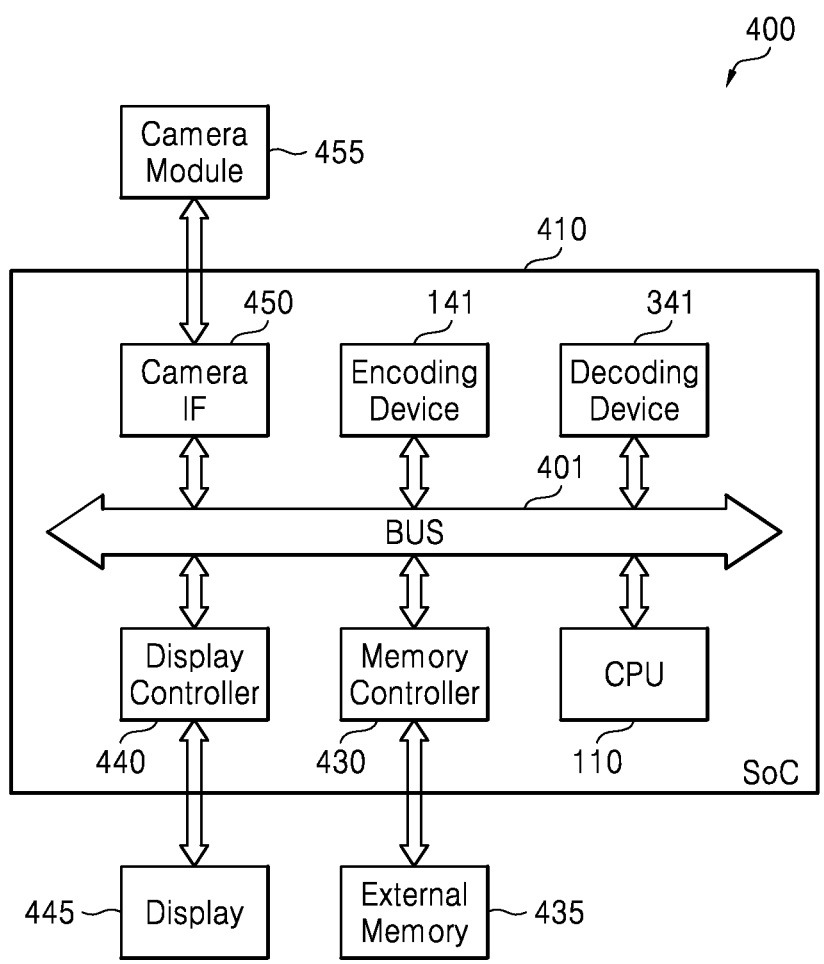
FIG. 14 is a block diagram illustrating an example embodiment of the system including the encoding device illustrated in FIG. 1.

FIG. 14 is a block diagram illustrating an example embodiment of the system including the encoding device illustrated in FIG. 1. Referring to FIGS. 1 and 14, a system 400 may be embodied as a portable device such as a mobile phone, a smart phone, a tablet PC, a laptop computer, a personal digital assistant (PDA), an enterprise digital assistant (EDA), a digital still camera, a digital video camera, a portable multimedia player (PMP), a personal navigation device or portable navigation device (PDN), a handheld game console, a mobile internet device (MID), a wearable computer, or an e-book.

The system 400 includes a system on chip (SoC) 410 and an external memory 435. According to an example embodiment, the system 400 may further include a display 445 or a camera module 455.

The SoC 410 controls an operation of an external memory 435, the display 445, or the camera module 455. According to an example embodiment, the SoC 410 may be referred to as an integrated circuit (IC), a processor, an application processor, a multimedia processor, or an integrated multimedia processor.

The SoC 410 includes a CPU 110, a memory controller 430, a display controller 440, a camera interface 450, a encoding device 141, and a decoding device 341. Each of components 450, 141, 341, 440, 430, and 110 may communicate (transmit or receive data) with each other through a bus 401. According to an example embodiment, an architecture of the bus 401 may be various. The CPU 110 reads and executes program commands so as to control respective components 450, 141, 341, 440, 430, and 110.

The memory controller 430 may transmit the encoded bitstream output from the encoding device 141 to the external memory 435 or transmit the encoded bitstream stored in the external memory 435 to the decoding device 341 for a decoding.

The external memory 435 may be a volatile memory or a non-volatile memory. The volatile memory may be a dynamic random access memory (DRAM), a static random access memory (SRAM), a thyristor RAM (T-RAM), a zero capacitor RAM (Z-RAM), or a Twin Transistor RAM (TTRAM). The non-volatile memory may be an Electrically Erasable Programmable Read-Only Memory (EEPROM), a flash memory, a Magnetic RAM (MRAM), a Phase change RAM (PRAM), or a resistive memory.

The display controller 440 controls the display 445 so that video data decoded by the decoding device 341 may be displayed on the display 445. The display 445 may be a liquid crystal display (LCD), a light emitting diode (LED) display, an organic light emitting diode (OLED) display, an active-matrix organic light-emitting diode (AMOLED) display, or a flexible display.

The camera module 455 means a module which may convert an optical image into an electric image. The electric image output from the camera module 455 may be in a RBG pixel format or a YUV pixel format. The electric image may be video source data. The electric image is transmitted to the encoding device 141 through the camera interface 450 for an encoding. The encoding device 141 is the encoding device 141 illustrated in FIG. 1.

The decoding device 341 decodes the encoded bitstream so as to display video data on the display 445 and outputs the video data to the display 445.

Figure 15:
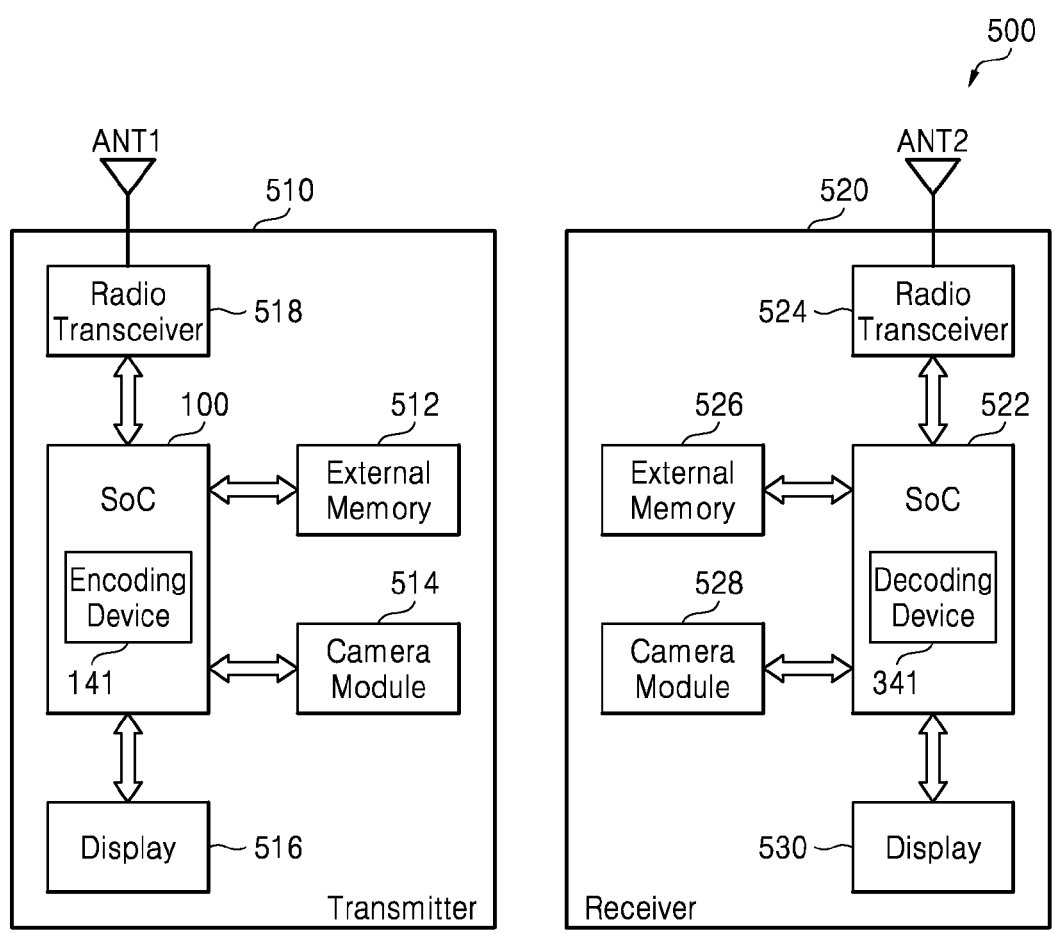
FIG. 15 is a block diagram illustrating another example embodiment of the system including the encoding device illustrated in FIG. 1.

FIG. 15 is a block diagram illustrating another example embodiment of the system including the encoding device illustrated in FIG. 1. Referring to FIGS. 1 and 15, a system 500 includes a transmitter 510 and a receiver 520. Each of the transmitter 510 and the receiver 520 may be a mobile phone, a smart phone, an MID, or a tablet PC.

The transmitter 510 includes a SoC 100, a display 516, a camera module 514, an external memory 512, and a wireless transceiver 518. The SoC 100, the display 516, the camera module 514, and the external memory 512 are respectively similar to the SoC 410, the display 445, the camera module 455, and the external memory 435 in an operation and a function, so that detailed description thereof will be omitted.

The SoC 100 includes the encoding device 141 illustrated in FIG. 1. The wireless transceiver 518 may transmit the encoded bitstream to the receiver 520 through an antenna ANT. The transmitter 510 may operate as a receiver.

The receiver 520 includes a SoC 522, a display 530, a camera module 528, an external memory 526, and a wireless transceiver 524. The SoC 522, the display 530, the camera module 528, and the external memory 526 are respectively similar to the SoC 410, the display 445, the camera module 455, and the external memory 435 illustrated in FIG. 14 in an operation and a function, so that detailed description thereof will be omitted.

The SoC 522 may include the decoding device 341. The wireless transceiver 524 may receive the encoded bitstream from the transmitter 510 through an antenna ANT2. The receiver 520 may operate as the transmitter. The decoding device 341 may decode the encoded bitstream so as to display video data on the display 530 and output the decoded video data to the display 530.

A method and a device according to an example embodiment of inventive concepts may selectively output an encoded bitstream having the minimum distortion value so as to reduce degradation in image quality. Accordingly, the method and the device may determine a resolution of an image which accords with image standard and has better image quality according to a bit rate of network.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing device comprising:
a plurality of encoder circuits configured to generate a plurality of encoded bitstreams, respectively, the plurality of encoded bitstreams having different resolutions based on an original image, the plurality of encoder circuits further configured to generate a plurality of restored images having the same resolution as a first resolution of the original image using the plurality of encoded bitstreams, respectively;
wherein a first encoder circuit of the plurality of encoder circuits includes a first internal-encoder circuit configured to generate a first encoded bitstream associated with the first resolution,
and a second encoder circuit of the plurality of encoder circuits includes,
a down-scaler configured to generate a down-scaled image based on the original image, the down-scaled image having a resolution different from the first resolution,
a second internal-encoder configured to generate a second encoded bitstream from the down-scaled image, and
the plurality of encoded bitstreams includes the first encoded bitstream and the second encoded bitstream; and
and an output circuit configured to output one of the plurality of encoded bitstreams based on the plurality of restored images and the original image.

2. The image processing device of claim 1, wherein the first encoder circuit further includes a first internal-decoder configured to generate a first restored image having the first resolution using the first encoded bitstream, and
the second encoder circuit further includes, a second internal-decoder configured to generate a decoded image using the second encoded bitstream, and
an up-scaler configured to generate an up-scaled image having the first resolution using the decoded image,
the plurality of restored images include the first restored image and the up-scaled image.

3. The image processing device of claim 2, wherein the output circuit is configured to compare a first distortion value between the first restored image and the original image and a second distortion value between the up-scaled image and the original image.

4. The image processing device of claim 1, wherein the output circuit includes:
a comparator configured to compute difference values between the plurality of restored images and the original image and generate at least one selection signal related to a minimum difference value among the difference values; and
a selector configured to output the outputted encoded bitstream in response to the at least one selection signal.

5. The image processing device of claim 1, wherein the image processing device is configured to provide video hosting services.

6. The image processing device of claim 1, further comprising:
an up-scaler;
a decoder configured to decode the outputted encoded bitstream, and generate a switch signal and the decoded bitstream; and
a switch configured to bypass the decoded bitstream to a display or transmit the decoded bitstream to the up-scaler based on the switch signal.

7. The image processing device of claim 6, wherein the decoder is configured to extract and store a resolution of the outputted encoded bitstream by parsing the outputted encoded bitstream, and generate the switch signal according to a result of comparing a resolution of the decoded bitstream with the stored resolution.

8. The image processing device of claim 1, wherein the first resolution is an original resolution of the original image.

9. A system on chip (SoC) comprising: an image processing device configured to process an original image output from a memory storing the original image,
the image processing device including,
a plurality of encoder circuits configured to generate a plurality of encoded bitstreams, respectively, the plurality of encoded bitstreams having different resolutions based on the original image, the plurality of encoder circuits further configured to generate a plurality of restored images having the same resolution as a first resolution of the original image using the plurality of encoded bitstreams, respectively;
wherein one of the plurality of encoder circuits includes a first internal-encoder circuit configured to generate a first encoded bitstream having the first resolution, and each of the remaining plurality of encoder circuits includes,
a down-scaler configured to generate a down-scaled image based on the original image, the down-scaled image having a resolution different from the first resolution, and
a second internal-encoder configured to generate a second encoded bitstream from the down-scaled image,
the plurality of encoded bitstreams includes the first encoded bitstream and the second encoded bitstream; and
and an output circuit configured to output one of the plurality of encoded bitstreams based on the plurality of restored images and the original image.

10. the SoC of claim 9, wherein the one of the plurality of encoder circuits further includes a first internal- decoder configured to generate a first restored image having the first resolution using the first encoded bitstream, and
each of the remaining plurality of encoder circuits further includes,
a second internal-decoder configured to generate a decoded image using the second encoded bitstream, and
an up-scaler configured to generate an up-scaled image having the first resolution using the decoded image,
the plurality of restored images include the first restored image and the up-scaled images.

11. The SoC of claim 10, wherein the output circuit is configured to compare a first distortion value between the first restored image and the original image and second distortion values between the up-scaled images and the original image.

12. The SoC of claim 9, wherein the output circuit includes:
a comparator configured to compute distortion values between each of the plurality of restored images and the original image, and generating at least one selection signal related to a minimum value among the distortion values; and
a selector configured to output the outputted encoded bitstream in response to the at least one selection signal.

13. The SoC of claim 9, wherein the first resolution is an original resolution of the original image.

14. An encoding device comprising:

a first encoder circuit configured to receive an original image and encode the original image, the original image having a first resolution, the first encoder circuit further configured to generate a first restored image based on the encoded original image, the first restored image being a first restored image of the original image;

at least one second encoding circuit including, a down scaler configured to receive the original image, down-scale the original image and generate a down-scaled image, the down-scaled image having a second resolution different than the first resolution, and an internal encoder configured to receive the down-scaled image and encode the down-scaled image, the at least one second encoding circuit further configured to generate a second restored image based on the encoded down-scaled image, the second restored image being a second restored image of the original image, an internal decoder configured to decode the encoded down-scaled image to generate a decoded down-scaled image, and an up scaler configured to up scale the decoded down-scaled image to the first resolution, the up scaled decoded down-scaled image being the second restored image; and an output circuit configured to select one of the encoded down-scaled image and the encoded original image to output based on the first and second restored images.

15. The encoding device of claim 14, wherein the at least one second encoding circuit includes a plurality of second encoding circuits, each of the plurality of second encoding circuits associated with a different resolution.

16. The encoding device of claim 14, wherein the output circuit includes, a comparator configured to determine a first difference value between the first restored image and the original image and a second difference value between the second restored image and the original image, and a selector configured to select one of the encoded down-scaled image and the encoded original image to output based on the first and second difference values.

* * * * *